United States Patent
Li et al.

(10) Patent No.: US 11,854,044 B2
(45) Date of Patent: *Dec. 26, 2023

(54) PROVIDING ADVERTISEMENTS FROM RELATED SEARCH QUERIES

(71) Applicant: Google LLC, Mountain View, CA (US)

(72) Inventors: Hui Li, Shanghai (CN); Yong Zhang, Shanghai (CN); Gangjiang Li, Shanghai (CN); Boon-Lock Yeo, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,650

(22) Filed: Apr. 19, 2022

(65) Prior Publication Data

US 2022/0237655 A1 Jul. 28, 2022

Related U.S. Application Data

(63) Continuation of application No. 16/527,706, filed on Jul. 31, 2019, now Pat. No. 11,334,916, which is a continuation of application No. 14/842,113, filed on Sep. 1, 2015, now abandoned, which is a continuation of application No. 12/511,752, filed on Jul. 29, 2009, now abandoned, which is a continuation of (Continued)

(51) Int. Cl.
| | |
|---|---|
| *G06Q 30/0251* | (2023.01) |
| *G06F 16/248* | (2019.01) |
| *G06F 16/9535* | (2019.01) |
| *G06Q 30/0241* | (2023.01) |
| *G06Q 30/02* | (2023.01) |

(52) U.S. Cl.
CPC ....... *G06Q 30/0256* (2013.01); *G06F 16/248* (2019.01); *G06F 16/9535* (2019.01); *G06Q 30/02* (2013.01); *G06Q 30/0251* (2013.01); *G06Q 30/0277* (2013.01)

(58) Field of Classification Search
CPC .............. G06Q 30/0256; G06Q 30/02; G06Q 30/0251; G06Q 30/0277; G06Q 30/0241; G06F 16/248; G06F 16/9535; G06F 16/00
See application file for complete search history.

(56) References Cited

U.S. PATENT DOCUMENTS

| | | | |
|---|---|---|---|
| 7,412,442 | B1 | 8/2008 | Vadon et al. |
| 7,934,161 | B1 | 4/2011 | Denise |
| 8,200,687 | B2 | 6/2012 | Gupta et al. |

(Continued)

FOREIGN PATENT DOCUMENTS

WO     WO 2006/009366     1/2006

OTHER PUBLICATIONS

International Preliminary Report on Patentability in International Appln. No. PCT/CN2009/000804, dated Jan. 17, 2012, 5 pages (with English translation).

(Continued)

*Primary Examiner* — Alexandru Cirnu
(74) *Attorney, Agent, or Firm* — Fish & Richardson P.C.

(57) ABSTRACT

Methods, systems and apparatus for identifying advertisements previously presented when processing related search queries related to a submitted search query, and providing the advertisements identified from the related search queries for presentation on a search results page for the submitted search query.

20 Claims, 6 Drawing Sheets

Related U.S. Application Data application No. PCT/CN2009/000804, filed on Jul. 17, 2009.

(56) References Cited

U.S. PATENT DOCUMENTS

| | | |
|---|---|---|
| 2003/0046161 A1 | 3/2003 | Kamangar et al. |
| 2008/0021878 A1* | 1/2008 | Jeong .................... G06Q 30/02 707/E17.14 |
| 2008/0140521 A1 | 6/2008 | Jambunathan et al. |
| 2008/0256059 A1* | 10/2008 | Chang ................ G06Q 30/0277 707/999.005 |
| 2011/0119139 A1 | 5/2011 | Dean et al. |

OTHER PUBLICATIONS

International Search Report and Written Opinion in International Appln. No. PCT/CN2009/000804, dated Apr. 15, 2010, 11 pages (with English translation).

Office Action in Korean Appln. No. 10-2012-7001288, dated Jul. 29, 2016, 7 pages (with English translation).

Office Action in Korean Appln. No. 10-2012-7001288, dated Nov. 21, 2016, 9 pages (with English translation).

* cited by examiner

200

Web   Images   Maps   News   Shopping   Gmail   more ▼

Google [ food ⎯209 ] [ Search ]   Advanced Search
                                     Preferences Web  News  Maps  Images  Blogs  Books     Results 1-10 of about 333,000, 000 for Food (definition)

Example Food Website .com
Find the best recipes, videos, healthy eating tips, quick
recipes and cooking techniques from the experts.
www.examplefoodwebsite.com/ – Cached- Similar Pages
   Recipes           Chefs
   Special Occasion   On-the-Go
   Organic           Cooking   ⎬212
   Italian Style      Desserts
[                    ]  Search Example Food Website

Food – Example Encyclopedia
The definition of Food is any substance comprised of....
www.examplefoodencyclopedia.com  - Cached- Similar Pages Sponsored Links
                      Restaurant Delivery
                      Search Local Restaurant
                      Menus and Order Your
                      Food Online Now!
                      www.examplead1.com   214

Food
                      Food & More
                      Locate a Food retailer
                      Near You
                      www.examplead2.com Searches Related to: Food
pictures of food  recipe       italian food   types of food ⎬216
food names        food magazine food history  desserts

Recipes                    Italian Restaurant              Example Food Magazines
Free Recipes, Cookbooks,   Craving Italian food? View Our  All Subscriptions You Need.
Cooking Ideas, 15-minute       Menus Today!                        New Customers Receive
Meals, etc.                    www.examplead4.com                  15% Off.
www.examplead3.com                                                 www.examplead5.com 218
G o o o o o o o o o g l e ▶
1 2 3 4 5 6 7 8 9 10  Next
[+]  Add a result - See all my Search notes - See all notes for this Search - Learn more

[ Food ]  [ Search ]
Search within results I Language Tools I Search Tips I Dissatisfied? Help us improve I Try Good Experimental Google Home – Advertising Programs – Business Solutions – Privacy – About Google

FIG. 2

PROVIDING ADVERTISEMENTS FROM RELATED SEARCH QUERIES

CROSS-REFERENCE TO RELATED APPLICATION

This application is a continuation application of, and claims priority to, U.S. patent application Ser. No. 16/527,706, titled "Providing Advertisements from Related Search Queries," filed on Jul. 31, 2019, which is a continuation application of, and claims priority to, U.S. patent application Ser. No. 14/842,113, now abandoned, titled "Providing Advertisements from Related Search Queries," filed on Sep. 1, 2015, which is a continuation application of, and claims priority to, U.S. patent application Ser. No. 12/511,752, now abandoned, titled "Providing Advertisements from Related Search Queries," filed on Jul. 29, 2009, which is a continuation of International Application No. PCT/CN2009/000804, titled "Providing Advertisements from Related Search Queries," filed Jul. 17, 2009. The disclosure of each of the foregoing applications is incorporated herein by reference.

BACKGROUND

This disclosure relates to online advertising.

The Internet provides access to a wide variety of resources such as video or audio files, web pages for particular subjects, book articles, or news articles. A search system can identify resources in response to a search query from a user that includes one or more search terms or phrases. The search system ranks the resources based on their relevance to the query and on measures of quality of the resources and provides search results that identify the resources (e.g., links to the resources).

Some search systems also provide search queries related to the search query submitted by the user to assist the user in locating desired search results. The related search queries can be based on, for example, known refinements to the search query (e.g., known from past search queries and refinements to those queries from other users). These related search queries can be presented on a search results page along with the search results responsive to the search query submitted by the user.

In addition to providing search results and/or related search results, the search system may also be provided advertisements associated with the search query. For example, an advertisement system can identify advertisements for the search query and provide the advertisements to the search system. These advertisements can be presented on the search results page along with the search results and the related search queries.

SUMMARY

In general, the subject matter of this specification relates to systems and methods for providing advertisements responsive to related search queries.

In general, one aspect of the subject matter described in this specification can be implemented in methods that include receiving in a computer system a first search query; receiving in the computer system related search queries, each related search query being related to the first search query; for each related search query, identifying by the computer system advertisements responsive to the related search query; and providing a subset of the advertisements identified from the related search queries and providing the related search queries for presentation in a first search results page with first search results responsive to the first search query on a client device; wherein selection of a related search query from the first search results page causes a second search results page with second search results responsive to the selected related search query to be requested by the client device. This and other implementations of this aspect include corresponding systems, apparatus, and computer program products.

Particular embodiments of the subject matter described in this specification can be implemented so as to realize one or more of the following advantages. Advertisements identified from related search queries can be presented to the user without the user having to first select one or more of the related search queries. As the related queries are refined queries that are more targeted to users' interests, the advertisements that are responsive to the related queries are likewise more targeted to the users' interests. Thus, the number of relevant advertisements presented to a user in response to a search query submitted by the user can be increased. The related advertisements can optionally be presented with the related queries to indicate that the advertisements are responsive to queries that are likely more targeted than the user's query.

Such selection and presentation of advertisements resolves the problem that some generic keywords do not result in the identification of a sufficient number of high quality advertisements for presentation. Additionally, by positioning the related advertisements at the bottom of the page, underneath the related queries, the related advertisements are visually distinguished from the advertisements that are responsive to the query submitted by the user. Such positioning also takes advantage of the observed behavior that users tend to glance to the bottom of a page when they are not satisfied with the search results or advertisements presented in response to the query submitted by the user.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 2 is a screenshot of an example search results page presenting advertisements identified from related search queries.

Like reference symbols in the various drawings indicate like elements.

DETAILED DESCRIPTION

This disclosure relates to identifying advertisements responsive to search queries related to a submitted search query, and providing the advertisements from the related search queries for display on a search results page for the submitted search query. A submitted search query ("first search query") is a search query submitted during a current user search session. A related search query is a search query that is determined to be or classified as related or similar to the submitted search query. A related search query can be, for example, determined from past refinements by users to the submitted search query or similar search queries to obtain a desired search result.

Advertisements are identified from the submitted search query and from the related search queries. In some implementations, the advertisements identified from the submitted search query are presented on a first portion of a search results page, e.g., on a right hand side of the page or on a top section of the page, and the advertisements identified from the related search queries, which are referred to as "related advertisements," are presented on a second portion of the page, e.g., the bottom of the page and/or adjacent to a list of several related search queries.

§ 1.0 Example Advertising Environment

Figure 1:
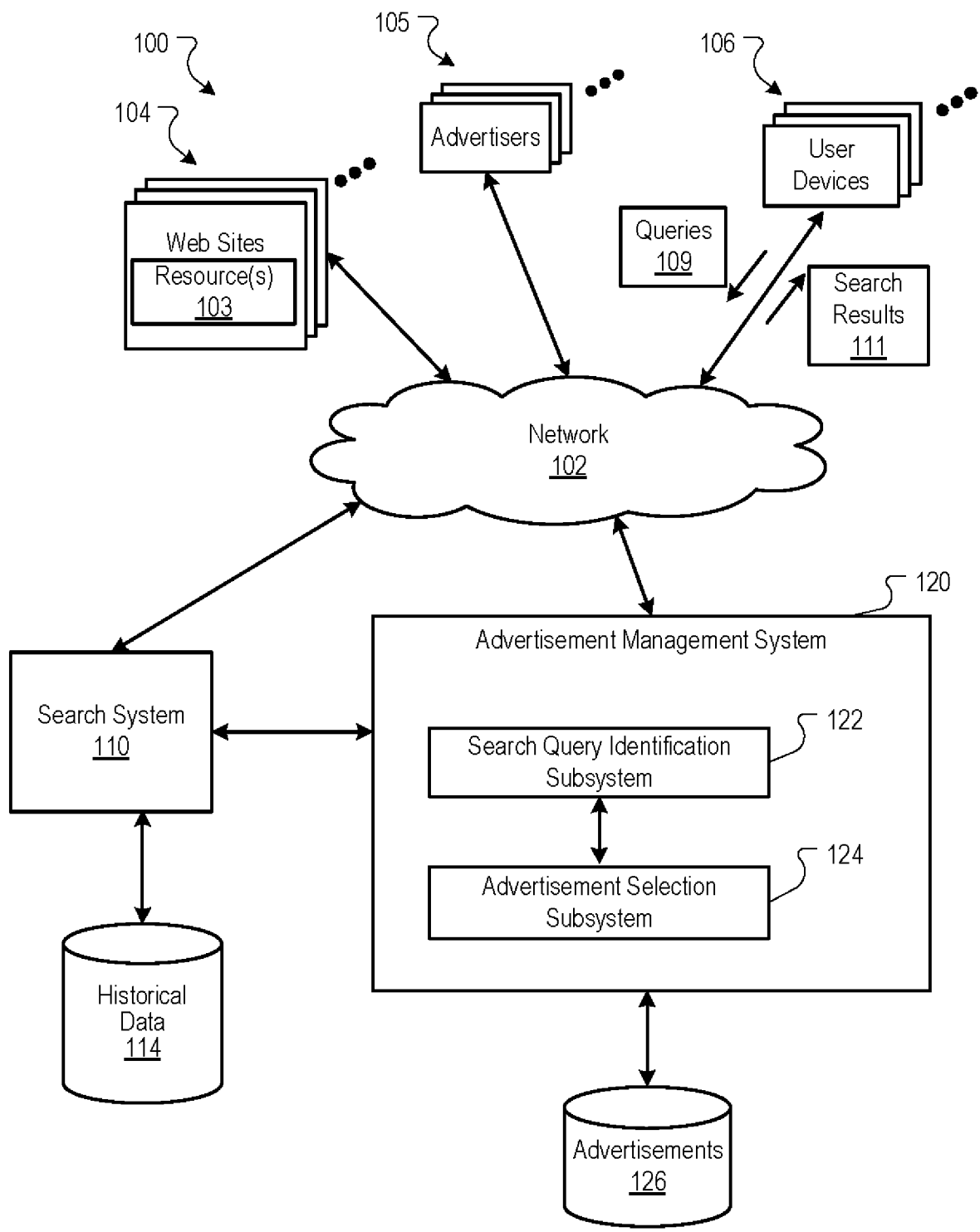
FIG. 1 is a block diagram of an example environment in which advertisements identified from related search queries can be provided.

FIG. 1 is a block diagram of an example environment 100 in which advertisements identified from related search queries can be provided. The example environment 100 includes a network 102, e.g., a local area network (LAN), wide area network (WAN), the Internet, or a combination of them, publishers 104, user/client devices 106, a search system 110, and an advertisement management system 120. The environment 100 may include many thousands of web sites 104 and user devices 106.

One or more advertisers 105 can directly, or indirectly, enter, maintain, and track advertisement information in the advertisement management system 120. The advertisements can be in the form of graphical advertisements, such as banner advertisements, text only advertisements, image advertisements, audio advertisements, video advertisements, advertisement gadgets with or without interactive features, advertisements combining one or more of any of such components, etc., or any other type of electronic advertisement document.

A web site 104 is a one or more web page resources 103 associated with a domain name, and each web site is hosted by one or more servers. An example web site is a collection of web pages formatted in hypertext markup language (HTML) that can contain text, graphic images, multimedia content, and programming elements, such as scripts. Each web site 104 is maintained by a publisher, e.g., an entity that manages and/or owns the web site. For brevity, the term "publisher" will also be used to refer to a web site 104 that is managed and/or owned by the publisher.

A resource 103 is any data that can be provided by the web site over the network 102 and that is associated with a resource address. Resources include HTML pages, word processing documents, and portable document format (PDF) documents, images, video, and feed sources, to name just a few. For the purposes herein, the term "web page resource", or simply "web page", will be used to describe resources that are accessed through a web browser or similar type of application for display on a user device. Web pages include content, e.g., words, phrases, images and sounds and may include embedded information (e.g., meta information and hyperlinks) and/or embedded instructions (e.g., JavaScript scripts). The web pages are stored and retrieved from web servers that host the web page, and are typically requested and served from the web server using Hypertext Transfer Protocol (HTTP).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

The advertisements can include embedded links to landing pages, i.e., web pages on the advertisers websites that a user is directed to when the user clicks an advertisement presented on a website.

To facilitate searching of resources, the search system 110 identifies the resources by crawling and indexing the resources provided by the web sites 104. Data about the resources can be indexed based on the resource to which the data corresponds.

The user devices 106 submit search queries 109 to the search system 110. In response, the search system 110 identifies resources that are relevant to the search query 109. The search system 110 generates search results 111 that identify the relevant resources, and returns the search results 111 to the user devices 106. The search results 111 can be presented on a search results page. The search results page can also include advertisements relevant to the search query 109. The advertisements can be provided by the advertisement management system 120. A search result 111 is data generated by the search system 110 that identifies a resource that is responsive to a particular search query, and often includes a link to the resource. An example search result 111 can include a web page title, a snippet of text or a portion of an image extracted from the web page, and the URL of the web page.

The search system 110 also submits a request for advertisements to the advertisement management system 120. The request may include the number of advertisements desired. This number may depend on the search results, the amount of screen or page space occupied by the search results, the size and shape of the advertisements, etc. The request for advertisement also includes the search query (as entered or parsed), and information based on the search query, including related search queries.

The advertisement management system 120 processes the submitted search query and related search queries to identify advertisements responsive to the submitted search query and the related search queries, and provides the advertisements to the search system 110. The search system 110 combines the search results with the advertisements, as described below, and sends the combined search results and advertisements to the user device 106 from which the submitted search query was received.

The user devices 106 receive the search results, e.g., in the form of one or more web pages, and render the pages for presentation to users. In response to the user selecting a link in a search result at a user device 106, the user device 106 requests the resource identified by the link. The web site hosting the resource receives the request for the resource from the user device 106 and provides the resource to the requesting user device 106.

Search queries 109 submitted during user sessions are stored in a data store such as the historical data store 114. Selection data specifying actions taken in response to search results provided are also stored in the historical data store 114. These actions can include whether a search result was selected, or whether other content on the search results page was selected (e.g., advertisements or related search queries).

Refinement data specifying refinements to search queries are also stored in the historical data store 114. The refinement data provide an index of search queries and related search queries. There are many different ways to determine related search queries for a search query. For example, query logs can be processed to determine the order in which users submitted search queries, and click logs can be processed to determine the click through rate of the search queries. Related search queries can be, for example, search queries that are related to a submitted search query by keywords associated with the queries and/or by the subject matter or the topic of the queries.

The advertisement management system 120 includes a search query identification subsystem 122 that is in data communication with the search system 110 and receives the submitted search query and the related search queries from the search system 110. The search query identification subsystem 122 then identifies the submitted search query and the related search queries provided from the search system 110.

The advertisement management system 120 also includes an advertisement selection subsystem 124 that identifies advertisements responsive to the submitted search query and the related search queries. In some implementations, the selection subsystem 124 is an auction process that selects advertisements. Each advertiser is permitted to bid an amount the advertiser is willing to pay for actions related to an advertisement, e.g., a cost-per-click amount an advertiser pays when, for example, a user clicks on an advertisement. The cost-per-click is typically a maximum cost-per-click, e.g., the maximum amount the advertiser is willing to pay for each click of an advertisement based on a keyword.

The rank of an advertisement that is displayed can be determined by multiplying the maximum cost-per-click for the advertisement by a quality score of the advertisement. The quality score for an advertisement is proportional to one or more performance metrics, such as click through rate of the advertisement. Additionally, the quality score can vary with the particular keywords related to the submitted query. For example, a keyword that results in a high click through rate for an advertisement can increase the quality score of the advertisement for that keyword, while a keyword that results in a low click through rate for an advertisement can decrease the quality score of the advertisement for that keyword.

The advertisements are then placed among other advertisements in order of increasing or decreasing rank. For example, suppose the quality score of advertisements A, B, and C and the maximum cost-per-clicks for advertisements A, B, and C are "3," "1," and "1," and "$0.50," "$0.75," and "$1.00," respectively. The rank of advertisement A, B, and C can be determined as follows:

A: Rank=quality score×maximum cost-per-click=3.0× $0.50=1.50

B: Rank=quality score×maximum cost-per-click=1.0× $0.75=0.75

C: Rank=quality score×maximum cost-per-click=1.0× $1.00=1.00

The advertisements can be ranked as follows:

1. A
2. C
3. B

The advertisement selection subsystem 124 processes the submitted search query to identify advertisements that are responsive to the submitted search query, and also processes the related search queries to identify related advertisements that are responsive to the related search queries. In some implementations, the related advertisements are identified as a set of advertisements that are presented separately from the advertisements that are responsive to the submitted search queries.

In some implementations, the advertisement selection subsystem 124 can provide the advertisements identified from the related search queries, or a subset thereof, to the search system 110 for presentation with search results 111 responsive to the submitted search query. The advertisements that are provided can be accessed from a data store, e.g., the advertisement data store 126.

§ 2.0 Example Presentation of Advertisements from Related Search Queries

FIG. 2 is a screenshot of an example search results page 200 presenting advertisements identified from related search queries. Search results page 200, for example, can be provided for display on a user device 106 in response to a user using the user device 106 to submit a search query 209 for "food" to the search system 110. The search results page 200 includes search results 212 for the food search query. For example, the search results 212 identify resources 103 (e.g., web pages) such as the "Example Food Website.com," and "Food-Example Encyclopedia."

The search results page 200 can also include advertisements 214 specifically selected based on the search query for "food" (e.g., advertisements selected based on the keyword "food" or keywords similar to "food"). For example, the advertisements 214 include advertisements for "Restaurant Delivery," and "Food."

The search results page 200 also includes search queries 216 related to the submitted search query for "food." For example, the related search queries 216 include "pictures of food," "recipe," "italian food," "types of food," "food names," "food magazine," "food history," and "desserts." As described above, such related search queries can be determined by the search system 110 and received from the search system 110. For example, using one of several data mining techniques, the search system 110 can access search query refinements from other users that submitted the same or similar search queries to identify related search queries.

Advertisements 218 identified from the related search queries can also be presented on the search results page 200. These advertisements are, for example, identified using the same auction process that is used to identify the advertisements 214 for the submitted search query 209. For example, the advertisements 218 include advertisements for "Recipes," which is an advertisement from the related search query "recipe;" "Italian Restaurant," which is an advertisement from the related search query "italian food;" and "Example Food Magazines," which is an advertisement from the related search query "food magazine." Although the search and search results page 200 are directed to a search for web pages, the system and methods disclosed in this specification are applicable to any vertical search system (e.g., image searches).

The advertisements 218 identified from the related search queries 216 are presented to the user without the user having to first select one or more of the related search queries. As the related queries are derived from refined queries, the latter being a signal of targeted user interests, the advertisements that are responsive to the related queries are likewise more targeted to the targeted user interests. Thus, the number of relevant advertisements presented to a user in response to a search query submitted by the user can be increased.

Such selection and presentation of advertisements resolves the problem that some generic keywords do not result in the identification of a sufficient number of high quality advertisements for presentation (e.g., by providing additional advertisements that would not be identified for the submitted search query). Additionally, by positioning the related advertisements at the bottom of the page, beneath or adjacent to the related search queries, the related advertisements are visually distinguished from the advertisements that are responsive to the query input by the user. Such positioning also takes advantage of the observed behavior that users tend to glance to the bottom of a page when they are not satisfied with the search results or advertisements presented in response to the search query submitted by the user.

§ 3.0 Example Process for Providing Advertisements from Related Search Queries

Figure 3:
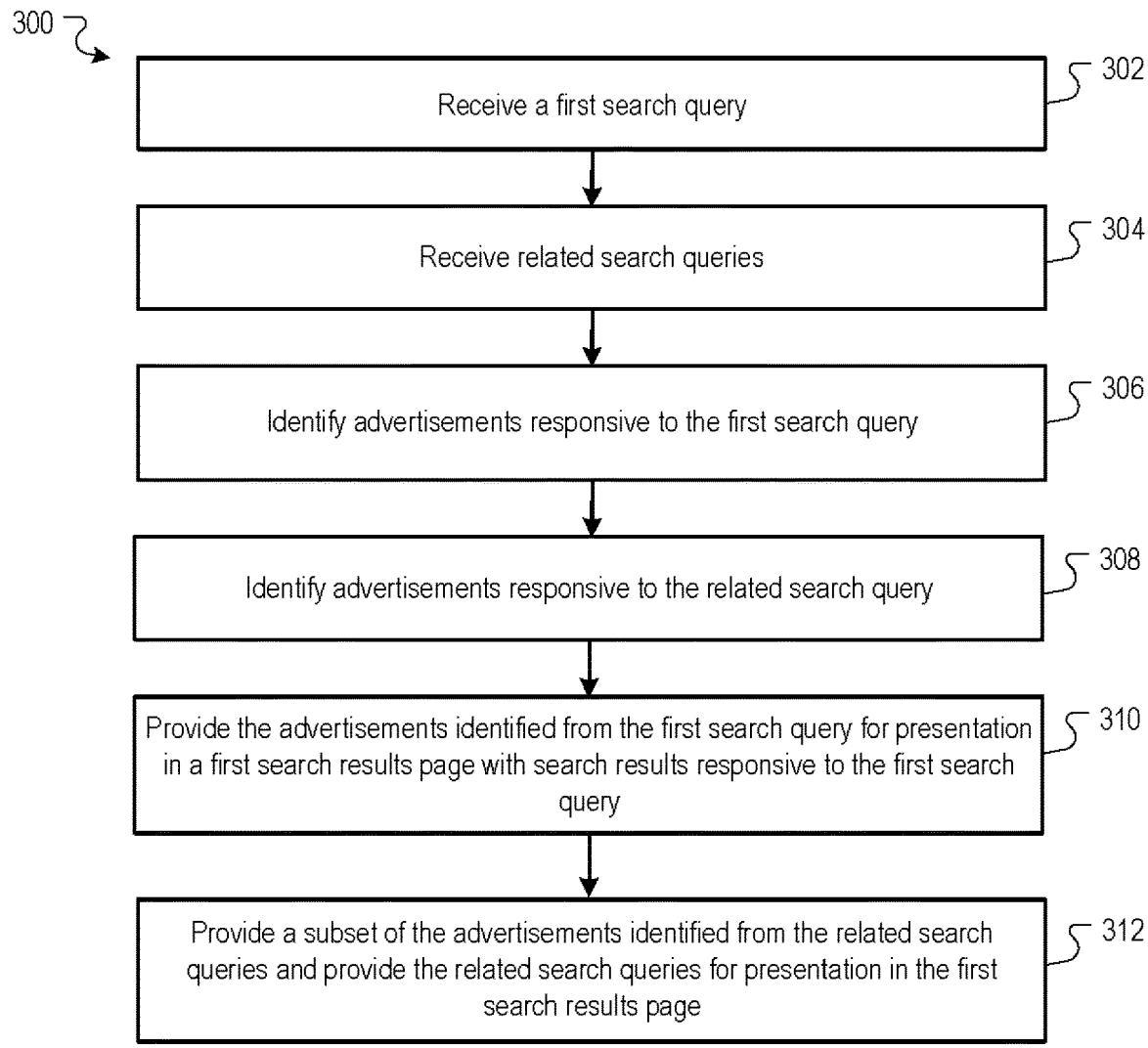
FIG. 3 is a flow chart of an example process for providing the advertisements identified from search queries related to a submitted search query for display on a search results page responsive to the submitted search query.

FIG. 3 is flow chart of an example process 300 for providing the advertisements identified from search queries related to a submitted search query for display on a search results page responsive to the submitted search query. The process 300 can be implemented, for example, by the advertisement management system 120 or by the advertisement management system 120 and the search system 110.

A first search query is received (302). A first search query is a search query submitted by a user of a user device 106 to the search system 110. The first search query can be the initial search query submitted by the user during a user search session or any subsequent search query submitted by the user during the user search session. For example, the search query identification subsystem 122 can receive a first search query submitted to the search system 110, e.g., by receiving the submitted query from the search system 110 as part of an advertisement request.

Related search queries are received (304). Each related search query is related to the first search query. Related search queries are, for example, identified by the search system 110 from past user search session data, and are received by the search query identification subsystem 122, e.g., by receiving the related queries from the search system 110 as part of an advertisement request.

Advertisements responsive to the first search query are identified (306). The advertisements can be identified by conducting an auction for the first search query. The advertisement selection subsystem 124 can, for example, identify advertisements responsive to the first search query.

For each related search query, advertisements responsive to the related search query are identified (308). As described above, the advertisements can be identified by conducting an auction for each related search query in the same manner that the auction is conducted for the submitted search query. For example, the advertisement selection subsystem 124 can identify advertisements responsive to the related search query.

Advertisements identified from the first search query are provided for presentation with first search results responsive to the first search query (310). The advertisement selection subsystem 124 can, for example, identify advertisements from the first search query to provide for presentation in a first search results page with first search results responsive to the first search query.

A subset of the advertisements identified from the related search queries and the related search queries are provided for presentation in the first search results page with the first search results responsive to the first search query (312). For example, the advertisement selection subsystem 124 can identify a subset of the advertisements from the related search queries to provide for presentation in the first search results page. Selection of a related search query from the first search results page can cause a second search results page with second search results responsive to the selected related search query to be requested by the client device. For example, selecting a related search query 216 results in the client device 106 requesting a second search results page with search results responsive to the related search query 216.

Figure 5:
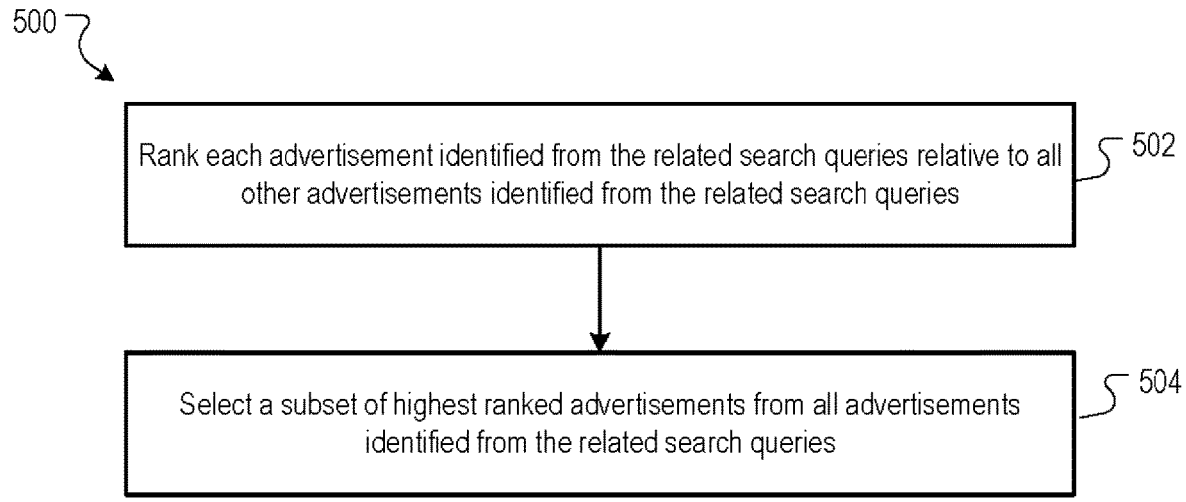
FIG. 5 is a flow chart of an example process for ranking advertisements identified from a related search query relative to all other advertisements identified from the related search queries.
Figure 6:
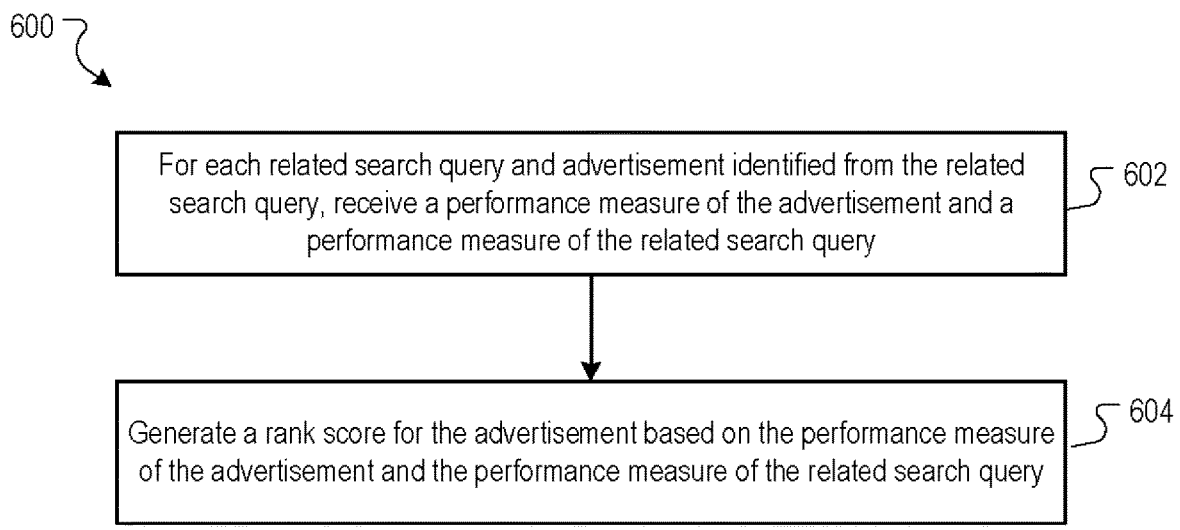
FIG. 6 is a chart of an example process for ranking advertisements identified from related search queries based on performance measures of the advertisements and performance measures of the related search queries.

The subset of advertisements may include all of the identified advertisements or a proper subset of all of the identified advertisements. A proper subset of the advertisements may be selected based on numerous criteria. For example, the advertisements identified from the related search queries can be ranked, and the subset of the advertisements can be selected based on the ranking of the advertisements, as described below with reference to FIGS. 4-6. The rankings described with reference to FIGS. 4-6 are used for selecting which advertisements identified from the related search queries are to be presented on the first search results page, and are generally distinct from the rankings of the auction process used to initially identify the advertisements.

In some scenarios, depending on the first search query, advertisements responsive to the first search query may not always be available. If the first search query is, for example, too generic or focused, the query may not trigger any advertisements. For example, a submitted search query for "stuff" may be too generic to trigger an advertisement. However, advertisements identified from the related search queries can still be provided for display with the search results (e.g., on search results page 200) even if no advertisements are identified from the first search query.

Figure 4:
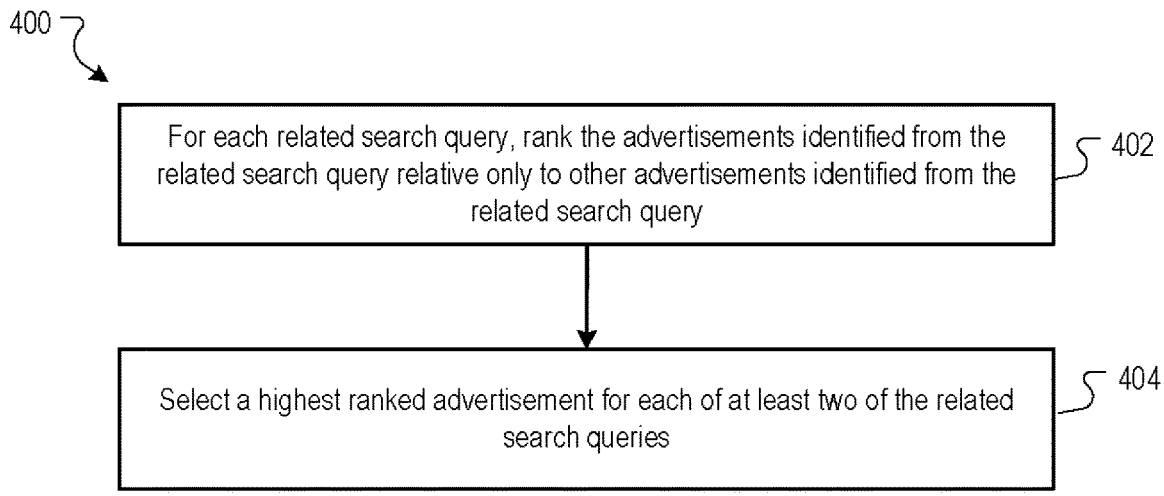
FIG. 4 is a flow chart of an example process for ranking advertisements identified from a related search query relative only to other advertisements identified from the related search query.

FIG. 4 is a flow chart of an example process 400 for ranking advertisements identified from a related search query relative only to other advertisements identified from the related search query. The process 400 can be implemented in the advertisement selection subsystem 124.

For each related search query, the advertisements identified from the related search query are ranked relative only to other advertisements identified from the related search query (402). In other words, a group of advertisements identified from a related search query are ranked independently of other groups of advertisements identified from other related search queries. For example, for a particular submitted search query advertisements A, B and C may be identified from related search query 1, advertisements D, E, F and G may be identified from related search query 2, and advertisements H and I may be identified from related search query 3, as shown in Table 1 below:

TABLE 1

| Query | Ads |
| --- | --- |
| Query 1 (Related) | A, B, C |
| Query 2 (Related) | D, E, F, G |
| Query 3 (Related) | H, I |

Advertisements A, B and C are ranked relative to only each other, i.e., the rankings of advertisements D, E, F and G and H and I do not affect the rankings of advertisements A, B and C and vice-versa. The advertisement selection subsystem 124 can, for example, rank advertisements identified from a related search query relative only to other advertisements identified from the related search query.

A highest ranked advertisement for each of at least two of the related search queries is selected (404). Thus a first advertisement is selected from the advertisements identified from a first related search query (i.e., advertisement A from related search query 1, the highest ranked advertisement from the first related search query) and a second advertisement is selected from the advertisements identified from a second related search query (i.e., advertisement D from related search query 2, the highest ranked advertisement from the second related search query). Other highest ranked advertisements can also be selected from other related search queries. These highest ranked advertisements form the subset of the advertisements identified from the related search queries that are provided for presentation with the search results. The advertisement selection subsystem 124 can, for example, select a highest ranked advertisement for each of at least two of the related search queries. The ranking of an advertisement is explained below with reference to FIG. 6.

FIG. 5 is a flow chart of an example process 500 for ranking advertisements identified from a related search query relative to all other advertisements identified from the related search queries. The process 500 can be implemented in the advertisement selection subsystem 124, and can be used as an alternative to the process 400 of FIG. 4.

Each advertisement identified from the related search queries is ranked relative to all other advertisements identified from the related search queries (502). Thus every advertisement identified from a related search query is ranked in light of all advertisements identified from all other related search queries. For example, with reference to Table 1 above, each of the advertisement A-I would be ranked relative to all other advertisements A-I. The advertisement selection subsystem 124 can, for example, rank each advertisement identified from the related search queries relative to all other advertisements identified from the related search queries.

A subset of highest ranked advertisements is selected from all advertisements identified from the related search queries (504). For example, if the advertisements for the related search queries of Table 1 are ranked (from highest to lowest) as A, E, B, D, H, I, F, C and G, the subset of highest ranked advertisements can include A, E, B, D, and H. The advertisement selection subsystem 124 can, for example, select a subset of highest ranked advertisement from all advertisements identified from the related search queries.

FIG. 6 is a flow chart of an example process 600 for ranking advertisements identified from related search queries based on performance measures of the advertisements and performance measures of the related search queries. The process 600 can be implemented in the advertisement selection subsystem 124.

For each related search query and advertisement identified from the related search query, receive a performance measure of the advertisement and a performance measure of the related search query (602). The performance measure of the advertisement can be, for example, a click-through-rate of the advertisement, a conversion rate of the advertisement, or the like. The performance measure of the related search query can be, for example, a click-through rate of the related search query when presented on a search results page for a search query to which the related search query is related. The advertisement selection subsystem 124 can, for example, receive the performance measures.

A rank score for the advertisement based on the performance measure of the advertisement and the performance measure of the related search query is generated (604). The rank score of the advertisement can, for example, be based on the click-through rates (CTR) of the advertisement and related search query. For example, the rank score RS for the advertisements from related search queries 2 and 3 of Table 1 can be determined by the following equations:

$$RS(A2_i) = (CTR(\text{Query 2}) * CTR(Ad_i), i=1 \ldots 4$$

$$RS(A3_j) = (CTR(\text{Query 3}) * CTR(Ad_j), j=1,2$$

Where $Ad_i$ for $i=1 \ldots 4$ correspond to advertisements D, E, F and G, respectively, and $Ad_j$ for $j=1$ and 2 correspond to advertisements H and I, respectively. The advertisement selection subsystem 124 can, for example, generate the rank scores.

The ranking of the advertisements can be based on the rank scores of the advertisements. A highest ranked advertisement is an advertisement having a highest value of the multiplication of the click-through rate of the advertisement by the click-through rate of the related search query. If the process 400 is used, then, for example, at least one highest ranked advertisement based on the rank scores of $A2_i$ will be selected, and at least one highest ranked advertisement based on the rank scores of $A3_j$ will be selected, ensuring that at least one advertisement for each of the related queries 2 and 3 are selected. Conversely, if the process 500 is used, then, for example, the highest ranked advertisements based on all the rank scores of $A2_i$ and $A3_j$ will be selected. This latter ranking process does not ensure that an advertisement from each of the related search queries is selected; instead, the advertisements are selected based solely on their rank scores.

Figure 7:
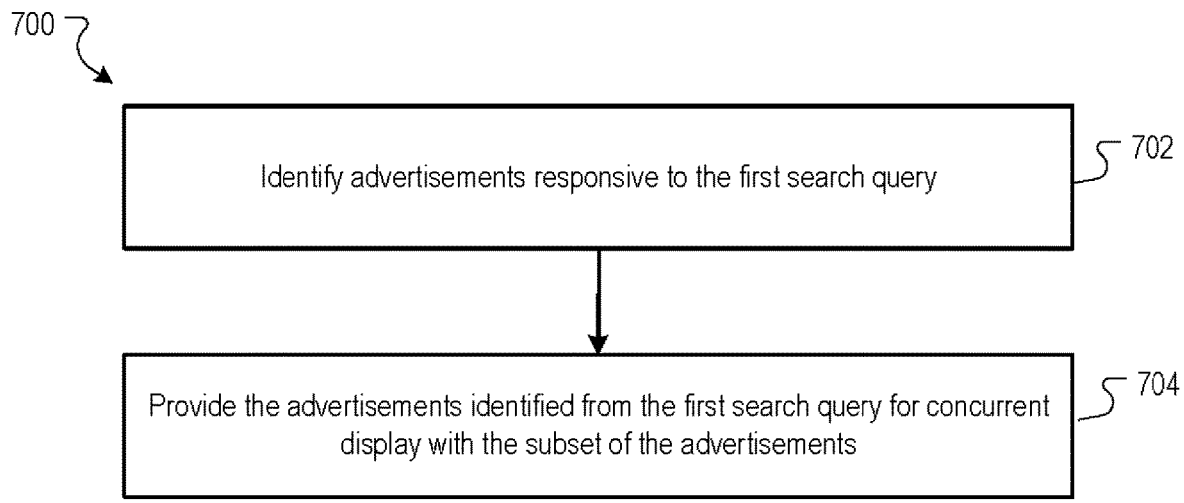
FIG. 7 is a flow chart of an example process for providing advertisements identified from a submitted search query with the advertisements identified from related search queries.

FIG. 7 is a flow chart of an example process 700 for providing advertisements identified from a submitted search query with the advertisements identified from related search queries. The process 700 can be implemented in the advertisement selection subsystem 124.

Advertisements responsive to the first search query are identified (702). The identified advertisements are advertisements that are to be presented for display on a user device based on the first search query (e.g., submitted search query).

The advertisements identified from the first search query are provided for concurrent display with the subset of the advertisements (704). Thus both the advertisements identified from the first search query and the advertisements identified from the related search queries (or a subset thereof) are provided for concurrent (simultaneous) display on a user device. For example advertisements 218 (i.e., advertisements identified from the related search queries) and advertisements 214 (i.e., advertisements identified from the first search query) of FIG. 2 are concurrently displayed on the search results page 200.

In some implementations, the related search queries are displayed below the search results from the first search query and the subset of the advertisements are provided for display below the search results and the related search queries. For example, with reference to FIG. 2, the related search queries 216 are displayed below the search results 212 and the advertisements identified from the related search queries 218 are displayed below both the search results 212 and related search queries 216. The search system 110 and/or the advertisement management system 120, for example, can cause the display of related search queries below the search results from the first search query and the display of the subset of the advertisements 218 below the search results and the related search queries. The subset of advertisements 218 can also, or alternatively, be displayed proximate (e.g., below, above, or among) the advertisements 214. For example, the advertisements 218 can be displayed on the right hand side of the search results page with the advertisements 214.

Figure 8:
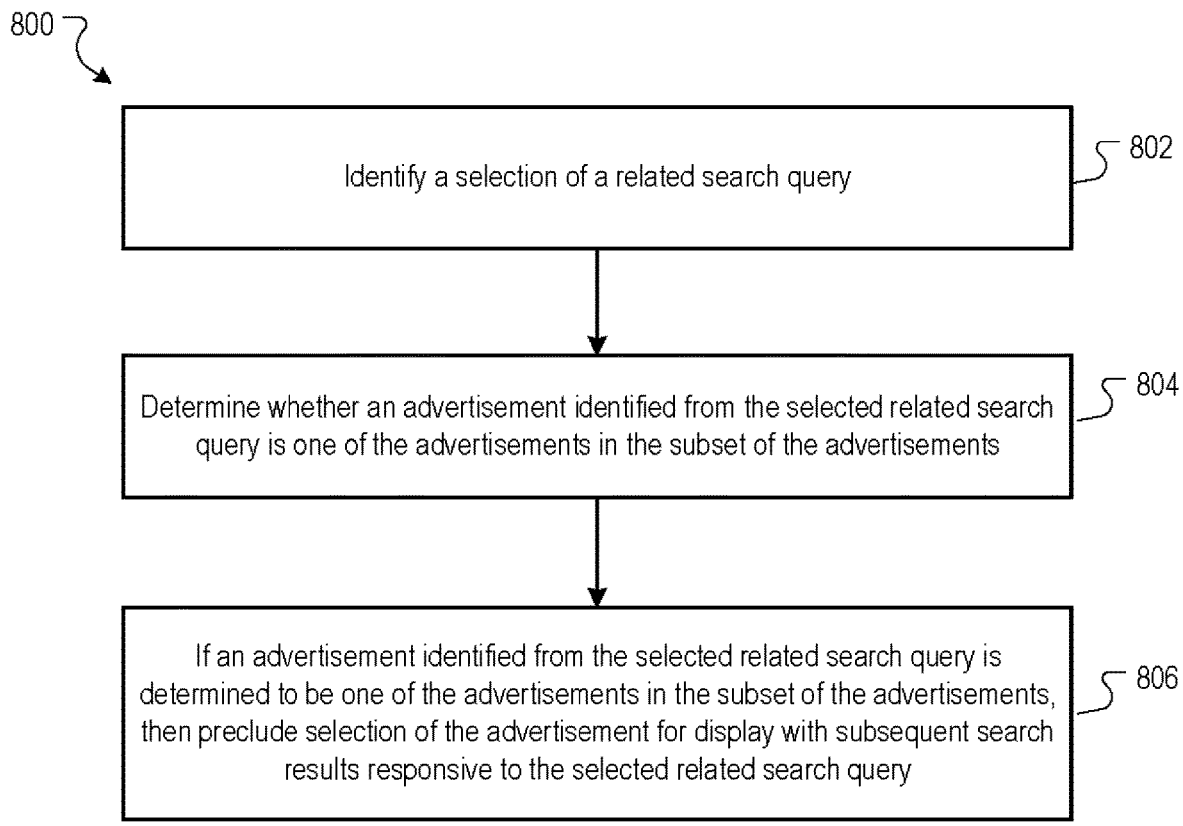
FIG. 8 is a flow chart of an example process for precluding selection of an advertisement for display based on a selected related search query.

FIG. 8 is a flow chart of an example process 800 for precluding selection of an advertisement for display based on a selected related search query. The process 800 is used to select advertisements for display on a subsequent search results page when a user selects a related search query presented on a first search results page.

A selection of a related search query is identified (802). After a search results page responsive to a submitted search query is presented to a user, the user may select a related search query (e.g., if the user is not satisfied with the search results from the first search query). The selection of this related search query can be identified, for example, by the advertisement management system 120, as it is in data communication with the search system 110.

The advertisement management system 120 determines whether an advertisement identified from the selected related search query is one of the advertisements in the subset of the advertisements presented on the search results page (804). As described above, advertisements 218 on search results page 200 are only from three of the eight related search queries (i.e., "recipe," "italian food," and "food magazine"). If the selected related search query is one of three related search queries with a corresponding advertisement displayed, then the advertisement management system determines that an advertisement identified from the selected related search query is one of the advertisements in the subset.

If an advertisement identified from the selected related search query is determined to be one of the advertisements in the subset, then selection of the advertisement for display with subsequent search results responsive to the selected related search query is precluded (806). Failure of the user to select an advertisement over the advertisement's related search query can be interpreted as a signal that the user would not select the advertisement on a search results page generated in response to the related search query. Thus, the advertisement is not shown on the search results page resulting from the selection of the related search query. For example, with reference to FIG. 2, if the related search query for "italian food" is selected then the advertisement for "Italian Restaurant" is precluded from being provided for display on the search results page having search results for the search query "italian food."

Selection of the advertisement can be precluded by reducing the rank of the advertisement, removing the advertisement from the list of possible advertisements to be provided, or the like. The advertisement management system 120 can, for example, preclude the selection of the advertisement for display with subsequent search results responsive to the selected related search query if the advertisement identified from the selected related search query is determined to be one of the advertisements in the subset of the advertisements.

§ 4.0 Example Processing System

Figure 9:
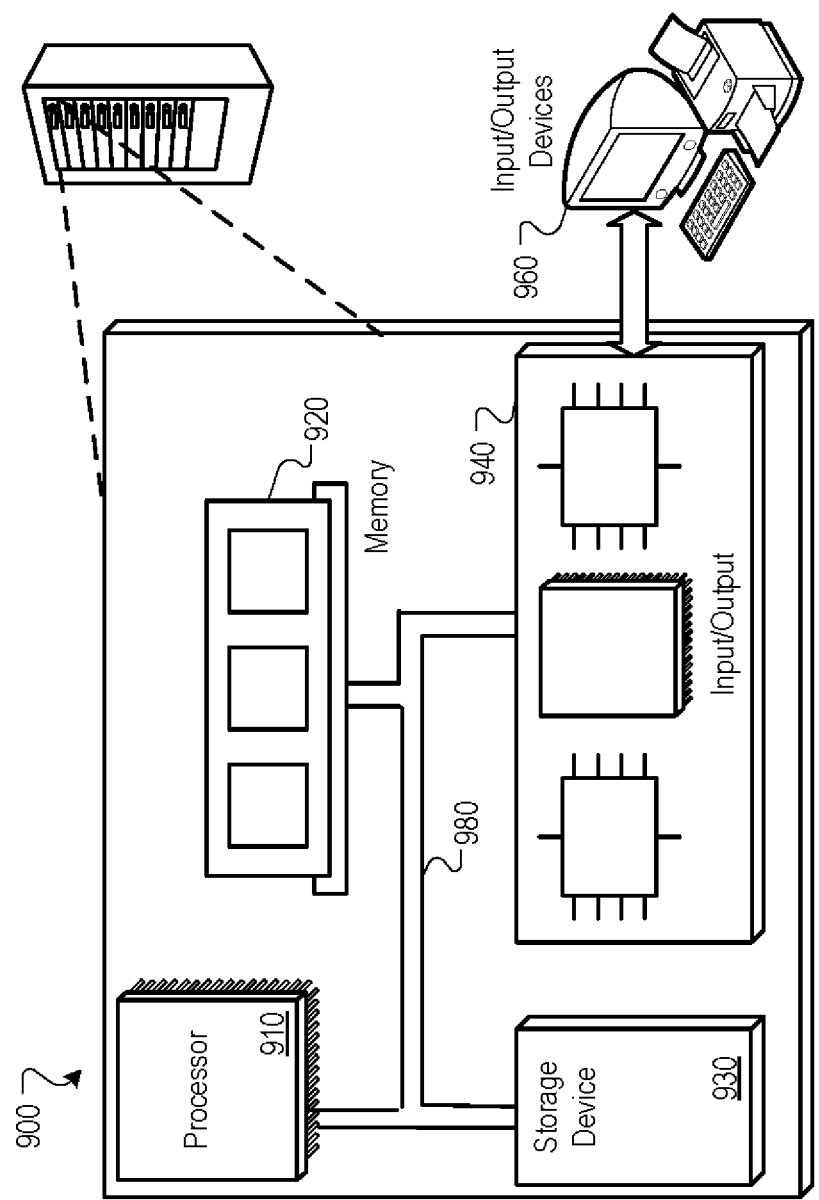
FIG. 9 is block diagram of an example computer processing system that can be used to provide advertisements identified from related search queries for presentation with search results responsive to a submitted search query.

FIG. 9 is block diagram of an example computer processing system 900 that can be used to provide advertisements identified from related search queries for presentation with search results responsive to a submitted search query. The system 900 can be used to realize a variety of different types of computer devices, such as the user devices 106 or server and computer devices on which the advertisement management system 120 and the search system 110 are implemented.

The system 900 includes a processor 910, a memory 920, a storage device 930, and an input/output device 940. Each of the components 910, 920, 930, and 940 can, for example, be interconnected using a system bus 980. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can, for example, include a hard disk device, an optical disk device, or some other large capacity storage device.

The input/output device 940 provides input/output operations for the system 900. In one implementation, the input/output device 940 can include one or more of a network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 960. Other implementations, however, can also be used, such as mobile computing devices, mobile communication devices, etc.

Although an example processing system has been described in FIG. 9, embodiments of the subject matter and the functional operations described in this specification can be implemented in other digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying Figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

The invention claimed is:

1. A computer-implemented method, comprising:
   receiving, by a computer system, a first search query submitted by a user device;
   obtaining, by the computer system, refined search queries that are identified using the first search query that was submitted by the user device, wherein the refined search queries are different from, and not included in, the first search query;
   identifying, by the computer system, first content using the first search query that was submitted by the user device;
   identifying, by the computer system, second content using the refined search queries; and
   populating, in response to receipt of the first search query that was submitted by the user device, a search results page with (i) first content identified using the first search query that was submitted by the user device, (ii) second content identified using the refined search queries without requiring the user to interact with any of the refined search queries to access the second content in a subsequently requested page, and (iii) at least one of the refined search queries that includes a link that initiates submission of the at least one of the refined queries to the computer system in response to user interaction with the at least one of the refined queries;
   detecting a selection of a presented refined search query;
   determining that the second content is eligible for presentation in a subsequent results page responsive to the selected refined search query; and
   populating the subsequent results page responsive to the selected refined search query while precluding the second content from inclusion in the subsequent search results page generated responsive to the selected refined search query based on the inclusion of the second content in the search results page.

2. The computer-implemented method of claim 1, further comprising:
  generating a search results page in response to receipt of the first search query that was submitted by the user device, wherein populating the search results page comprises:
    populating a first portion of the search results page with search results identified using the first search query that was submitted by the user device;
    populating a second portion of the search results page with the first content identified using the first search query that was submitted by the user device.

3. The computer-implemented method of claim 2, wherein populating the search results page further comprises:
  populating a third portion of the search results page with the second content identified using the refined search queries.

4. The computer-implemented method of claim 3, wherein populating the search results page further comprises populating a fourth portion of the search results page with the refined search queries.

5. The computer-implemented method of claim 4, wherein:
  the first portion, the second portion, the third portion, and the fourth portion of the search results page are each visually distinguishable from each other in the search results page; and
  the search results, the first content, the second content, and the refined search queries are each different from each other; and
  at least one of the refined queries has a link that initiates submission of the at least one of the refined queries to the computer system in response to user interaction with the at least one of the refined queries.

6. The computer-implemented method of claim 5, further comprising:
  ranking, by the computer system, the second content responsive to the refined search queries; and
  wherein identifying the second content comprises selecting the second content based on a ranking of the second content.

7. The computer-implemented method of claim 6, wherein:
  ranking, by the computer system, the second content identified using the refined search queries comprises, for each refined search query, ranking the second content identified using the refined search query relative only to other second content identified using the refined search query; and
  selecting the second content based on the ranking of the second content comprises selecting a highest ranked second content for each of at least two of the refined search queries.

8. A computer system comprising:
  a data storage device storing computer readable instructions; and
  one or more data processing devices configured to interact with the data storage device and execute the computer readable instructions, which causes the one or more data processing devices to perform operations comprising:
    receiving a first search query submitted by a user device;
    obtaining refined search queries that are identified using the first search query that was submitted by the user device, wherein the refined search queries are different from, and not included in, the first search query;
    identifying first content using the first search query that was submitted by the user device;
    identifying second content using the refined search queries; and
    populating, in response to receipt of the first search query that was submitted by the user device, a search results page with (i) first content identified using the first search query that was submitted by the user device, (ii) second content identified using the refined search queries without requiring the user to interact with any of the refined search queries to access the second content in a subsequently requested page, and (iii) at least one of the refined search queries that includes a link that initiates submission of the at least one of the refined queries to the computer system in response to user interaction with the at least one of the refined queries;
    detecting a selection of a presented refined search query;
    determining that the second content is eligible for presentation in a subsequent results page responsive to the selected refined search query; and
  populating the subsequent results page responsive to the selected refined search query while precluding the second content from inclusion in the subsequent search results page generated responsive to the selected refined search query based on the inclusion of the second content in the search results page.

9. The computer system of claim 8, wherein execution of the computer readable instructions causes the one or more data processing devices to perform operations further comprising:
  generating a search results page in response to receipt of the first search query that was submitted by the user device, wherein populating the search results page comprises:
    populating a first portion of the search results page with search results identified using the first search query that was submitted by the user device;
    populating a second portion of the search results page with the first content identified using the first search query that was submitted by the user device.

10. The computer system of claim 9, wherein populating the search results page further comprises:
  populating a third portion of the search results page with the second content identified using the refined search queries.

11. The computer system of claim 10, wherein populating the search results page further comprises populating a fourth portion of the search results page with the refined search queries.

12. The computer system of claim 11, wherein:
  the first portion, the second portion, the third portion, and the fourth portion of the search results page are each visually distinguishable from each other in the search results page; and
  the search results, the first content, the second content, and the refined search queries are each different from each other; and at least one of the refined queries has a link that initiates submission of the at least one of the refined queries to the computer system in response to user interaction with the at least one of the refined queries.

13. The computer system of claim 12, wherein execution of the computer readable instructions causes the one or more data processing devices to perform operations further comprising:
ranking the second content responsive to the refined search queries; and
wherein identifying the second content comprises selecting the second content based on a ranking of the second content.

14. The computer system of claim 13, wherein:
ranking the second content identified using the refined search queries comprises, for each refined search query, ranking the second content identified using the refined search query relative only to other second content identified using the refined search query; and
selecting the second content based on the ranking of the second content comprises selecting a highest ranked second content for each of at least two of the refined search queries.

15. A non-transitory computer readable storage medium storing instructions that, when executed, cause one or more data processors of a computer system to perform operations comprising:
receiving a first search query submitted by a user device;
obtaining refined search queries that are identified using the first search query that was submitted by the user device, wherein the refined search queries are different from, and not included in, the first search query;
identifying first content using the first search query that was submitted by the user device;
identifying second content using the refined search queries; and
populating, in response to receipt of the first search query that was submitted by the user device, a search results page with (i) first content identified using the first search query that was submitted by the user device, (ii) second content identified using the refined search queries without requiring the user to interact with any of the refined search queries to access the second content in a subsequently requested page, and (iii) at least one of the refined search queries that includes a link that initiates submission of the at least one of the refined queries to the computer system in response to user interaction with the at least one of the refined queries;
detecting a selection of a presented refined search query;
determining that the second content is eligible for presentation in a subsequent results page responsive to the selected refined search query; and
populating the subsequent results page responsive to the selected refined search query while precluding the second content from inclusion in the subsequent search results page generated responsive to the selected refined search query based on the inclusion of the second content in the search results page.

16. The non-transitory computer readable storage medium of claim 15, wherein execution of the instructions causes the one or more data processors to perform operations further comprising:
generating a search results page in response to receipt of the first search query that was submitted by the user device, wherein populating the search results page comprises:
populating a first portion of the search results page with search results identified using the first search query that was submitted by the user device;
populating a second portion of the search results page with the first content identified using the first search query that was submitted by the user device.

17. The non-transitory computer readable storage medium of claim 16, wherein populating the search results page further comprises:
populating a third portion of the search results page with the second content identified using the refined search queries.

18. The non-transitory computer readable storage medium of claim 17, wherein populating the search results page further comprises populating a fourth portion of the search results page with the refined search queries.

19. The non-transitory computer readable storage medium of claim 18, wherein:
the first portion, the second portion, the third portion, and the fourth portion of the search results page are each visually distinguishable from each other in the search results page; and
the search results, the first content, the second content, and the refined search queries are each different from each other; and
at least one of the refined queries has a link that initiates submission of the at least one of the refined queries to the computer system in response to user interaction with the at least one of the refined queries.

20. The non-transitory computer readable storage medium of claim 19, wherein execution of the instructions causes the one or more data processors to perform operations further comprising:
ranking the second content responsive to the refined search queries; and
wherein identifying the second content comprises selecting the second content based on a ranking of the second content.

* * * * *